(12) United States Patent
Vothknecht et al.

(10) Patent No.: US 7,657,895 B2
(45) Date of Patent: Feb. 2, 2010

(54) REAL TIME-CAPABLE CONTROL SYSTEM HAVING AN SPS APPLICATION UNDER A NON-REAL TIME-CAPABLE OPERATING SYSTEM

(75) Inventors: Claus Vothknecht, Schlangen (DE); Werner Pollmann, Hoexter (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 420 days.

(21) Appl. No.: 10/544,925

(22) PCT Filed: Aug. 19, 2003

(86) PCT No.: PCT/EP03/09170

§ 371 (c)(1),
(2), (4) Date: Mar. 27, 2006

(87) PCT Pub. No.: WO2004/029804

PCT Pub. Date: Apr. 8, 2004

(65) Prior Publication Data

US 2006/0212132 A1    Sep. 21, 2006

(30) Foreign Application Priority Data

Sep. 13, 2002  (DE)  .................................. 10242667

(51) Int. Cl.
*G06F 9/46*     (2006.01)
*G06F 13/24*    (2006.01)
*G06F 13/32*    (2006.01)

(52) U.S. Cl. ...................................... 718/107; 710/266

(58) Field of Classification Search .................... 700/9, 700/18, 245; 318/568.1; 710/260, 261, 266; 712/228; 718/100, 102, 107, 108
See application file for complete search history.

(56) References Cited

U.S. PATENT DOCUMENTS

| | | | | |
|---|---|---|---|---|
| 4,882,702 A | * | 11/1989 | Struger et al. | ................. 710/2 |
| 5,701,439 A | * | 12/1997 | James et al. | ................. 703/17 |
| 5,708,818 A | | 1/1998 | Munz et al. | ................. 395/740 |

(Continued)

FOREIGN PATENT DOCUMENTS

DE    44 06 094 C2    8/1995

(Continued)

OTHER PUBLICATIONS

Anwenderhandbuch Allgemeine Einführung in das INTERBUS-System, IBS SYS Intro G4 UM, Phoenix Contact, Nov. 2001, 12-page excerpt (discussed in specification).

(Continued)

*Primary Examiner*—Crystal J Barnes-Bullock
(74) *Attorney, Agent, or Firm*—Darby & Darby

(57) ABSTRACT

The invention relates to a real time-capable control system essentially consisting of a software-implemented SPS application that exchanges the output data and input data by means of a field bus connecting module. The SPS application runs on a computer under the control of a non-real time-capable operating system, whereby the full functionality of the non-real-time-capable operating system is maintained. The real time capability makes the field bus connecting module ready for use, and the data are exchanged between the field bus connecting module and the SPS application via the host interface located inside the computer.

19 Claims, 3 Drawing Sheets

U.S. PATENT DOCUMENTS

| | | | |
|---|---|---|---|
| 5,903,752 A | 5/1999 | Dingwall et al. | 395/673 |
| 5,974,439 A | 10/1999 | Bollella | |
| 6,031,973 A * | 2/2000 | Gomi et al. | 700/245 |
| 6,167,425 A | 12/2000 | Beckhoff | 709/103 |
| 6,411,863 B1 * | 6/2002 | Dickman | 700/206 |
| 6,571,137 B1 * | 5/2003 | Muller | 700/71 |
| 6,826,235 B2 * | 11/2004 | Lerner et al. | 375/262 |
| 6,999,996 B2 * | 2/2006 | Sunderland | 709/208 |
| 7,031,798 B2 * | 4/2006 | Brown et al. | 700/174 |
| 7,167,532 B1 * | 1/2007 | Bronfer et al. | 375/355 |
| 7,426,732 B2 * | 9/2008 | Alverson et al. | 718/108 |
| 2001/0054055 A1 * | 12/2001 | Bollella | 709/102 |
| 2002/0064157 A1 | 5/2002 | Krause | |
| 2006/0109866 A1 * | 5/2006 | Janssen et al. | 370/493 |

FOREIGN PATENT DOCUMENTS

| | | |
|---|---|---|
| DE | 19728726 | 1/1998 |
| DE | 196 48 422 C2 | 6/1998 |
| DE | 100 58524 | 6/2002 |

OTHER PUBLICATIONS

T. Pfeifer et al. "Flexible integration of various fieldbus and sensor/actuator bus systems into machine tool control", Microsystem Technologies, Berlin, Germany, vol. 3, No. 4, Aug. 1997, pp. 191-198, XP009021376.

International Search Report for International No. PCT/EP2003/09170 mailed on Feb. 15, 2006.

* cited by examiner

REAL TIME-CAPABLE CONTROL SYSTEM HAVING AN SPS APPLICATION UNDER A NON-REAL TIME-CAPABLE OPERATING SYSTEM

CROSS REFERENCE TO RELATED APPLICATIONS

This is a U.S. National Phase application under 35 U.S.C. §371 of International Application No. PCT/EP2003/009170, filed on Aug. 19, 2003, and claims the benefit of German Patent Application No. DE 102 42 667.8, filed on Sep. 13, 2002.

FIELD

The present invention relates to a real-time capable control system including a computer on which the PLC application is executed under the control of a non-real-time capable operating system.

BACKGROUND

In control systems, the output data to the actuators must be output in real time, for example, to enable servomotors to move synchronously. In order to comply with the real-time requirements, a control application, hereinafter referred to as "PLC application", must then be executed on a computer under the control of a real-time capable operating system. In addition to the application-specific control program, the PLC application includes at least the compiler or interpreter for executing the control program. The PLC application may also include additional functions for programming or verifying the control program. Now, if a PLC application were executed under the control of a non-real-time capable operating system, the instants for outputting the output data would not be clearly predictable. In this connection, what is decisive is not that other applications and the non-real-time capable operating system require time for themselves, but the determinability of the instant at which the output data is output to the actuator and the input data is valid. This problem may be solved by control systems which include at least one computer, a non-real-time capable operating system and a PLC application, which achieve the real-time capability of the control system using additional measures within the computer. German Patent DE 44 06 094 C2 describes a control system in which a PLC application running on a computer under a non-real-time capable operating system is made real-time capable by additional measures. Here, the interrupt requests to the processor are controlled by a so-called distributor in such a manner that the PLC application can be immediately activated upon request. The disadvantage here is that the so-called distributor for the interrupt requests must be adapted for each type of processor. Furthermore, this distributor must handle all interrupt requests, so that the time requirements of all applications requiring interrupts must be known.

German Patent DE 196 48 422 C2 describes a control system in which a real-time capable PLC application is implemented in a non-real-time capable operating system. Here, a timer already present in the computer is reprogrammed such that the PLC application is regularly activated to enable real-time capability. While the system is operating, the non-real-time capable operating system is deactivated as long as the real-time capable PLC application is active. After a predeterminable time, the timer deactivates the real-time capable PLC application and activates the non-real-time capable operating system. The activation of the real-time capable PLC application and deactivation of the non-real-time capable operating system alternates, at specifiable periods of time, with the deactivation of the real-time capable PLC application and activation of the non-real-time capable operating system. Since, in the control system described in DE 196 48 422 C2, the non-real-time capable operating system is deactivated while the real-time capable PLC application is active, the time requirements of all other applications and programs that are activated under the control of the non-real-time capable operating system must be known and taken into account. The computer-specific timers must also be known because they switch activity between the non-real-time capable operating system and the real-time capable PLC application via the interrupt control.

U.S. Pat. No. 5,903,752 describes a computer which has a non-real-time capable operating system and which is capable of activating the real-time capable applications through the addition of a program called real-time scheduler. This real-time scheduler is started by a non-real-time capable application, after which it then controls the real-time capable applications. A special feature of this type of real-time capability is that a real-time capable application without any functions called idle task, is activated by the real-time scheduler when the conditions for the real-time capable applications have expired. During this period, while the idle task is active, the non-real-time capable operating system controlling the non-real-time capable applications is activated. Here too, the real-time scheduler must be carefully implemented because the non-real-time capable operating system is intermittently interrupted. During this period, it is not possible to execute any functions of the non-real-time capable operating system, or to execute any non-real-time capable applications. Therefore, in case of faulty real-time-capable applications, the entire computer may be disabled unintentionally, which may further result in data loss.

SUMMARY

An aspect of the present invention is to provide a real-time capable control system, the PLC application being executed on a computer under the control of a non-real-time capable operating system, while maintaining the functionality of the non-real-time capable operating system.

In an embodiment, the present invention provides real-time capable control system. The system includes a computer having a non-real-time capable operating system, and configured to execute at least one PLC application under the control of the non-real-time capable operating system. A fieldbus interface module is connected to a core of the computer via a host interface. The system also includes a fieldbus operable to execute a fieldbus cycle and at least one fieldbus module connected via the fieldbus. The real-time capability of the control system is achieved by a fixed time-slot pattern corresponding to the execution of the fieldbus cycle.

BRIEF DESCRIPTION OF THE DRAWINGS

Exemplary embodiments of the system according to the present invention will be described in greater detail below with reference to the schematic figures, in which.

DETAILED DESCRIPTION

In an embodiment, the present invention provides a PLC application including all necessary functions required for the execution of an application-specific control program. These functions include, for example, a compiler, an interpreter, or programming or command input tools. As a rule, the PLC application is a software running under a non-real-time capable operating systems, such as the commonly known Windows NT, 95, 98, 2000, CE, XP operating systems of the Microsoft company. In the following, "real-time capable" is taken to refer to the predeterminable time during which output data is regularly output to the application-specific actuators. The control system of the present invention is suitable, for example, for positioning drives which, in each instance, receive the calculated output data for their new positions at predetermined time intervals with tight tolerance limits. The predetermined time intervals for outputting the output data are implemented using a fieldbus interface card additionally inserted into the PC and fieldbus modules connected via the fieldbus. Fieldbus interface cards are generally known and described, for example, in the "User Manual General Introduction to the INTERBUS System, IBS SYS INTRO G4 UM". Since the operating system is not real-time capable, the instant for the PLC application to start calculating the output data is not predeterminable, but it is ensured that the PLC application calculates output data and transfers this data to the fieldbus interface module once within the predetermined time intervals. The output data, which represents, for example, states of sensors or limit switches, are read in by the fieldbus interface module, also within the predetermined time intervals, and are available to the PLC application for calculating the output data.

For the sake of completeness, it should be added that that transmission of the data from the fieldbus interface module to the positioning drives is via a fieldbus, such as Interbus, for which purpose the positioning drives contain a fieldbus module or receive the output data via a fieldbus module. The data from the sensors or limit switches to the fieldbus interface module is transmitted via the same fieldbus, for example Interbus, for which purpose the sensors or limit switches each contain a fieldbus module or provide the input data via a fieldbus module.

Figure 1:
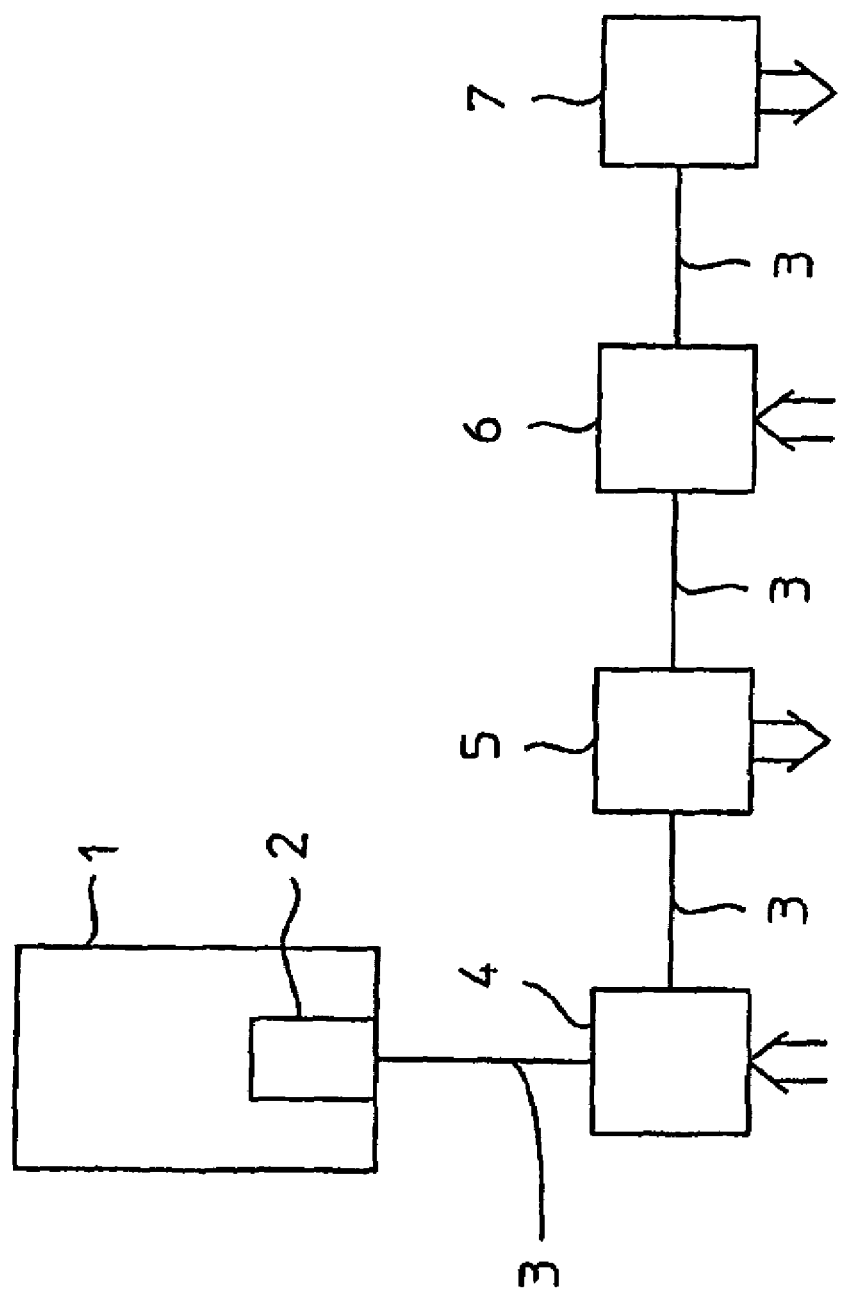
FIG. 1 shows an exemplary system including a computer, a fieldbus, and fieldbus modules.

The exemplary system shown in FIG. 1 includes a computer 1 on which a PLC application is executed, which calculates output data for fieldbus modules 5 or positioning drives 7 (not further described) and receives input data from fieldbus modules 4, 6. In this connection, fieldbus interface module 2 forms the interface between computer 1 and fieldbus 3; said fieldbus 3 being used to transmit the output data calculated in the computer to fieldbus module 4 or positioning drive 7 and to transmit the input data from fieldbus modules 4, 6 to the computer. The fieldbus provided may be the Interbus, but other fieldbuses can also be used.

Figure 2:
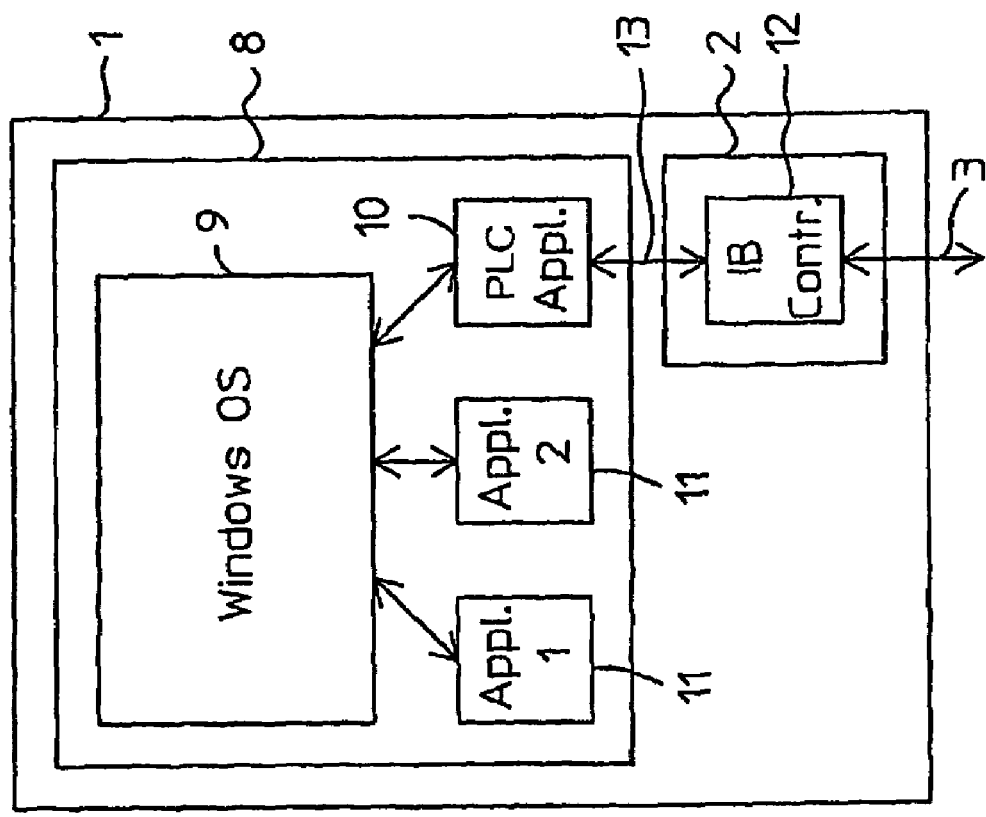
FIG. 2 is an overview of the functional units for a PLC application in conjunction with a fieldbus interface module.
Figure 3:
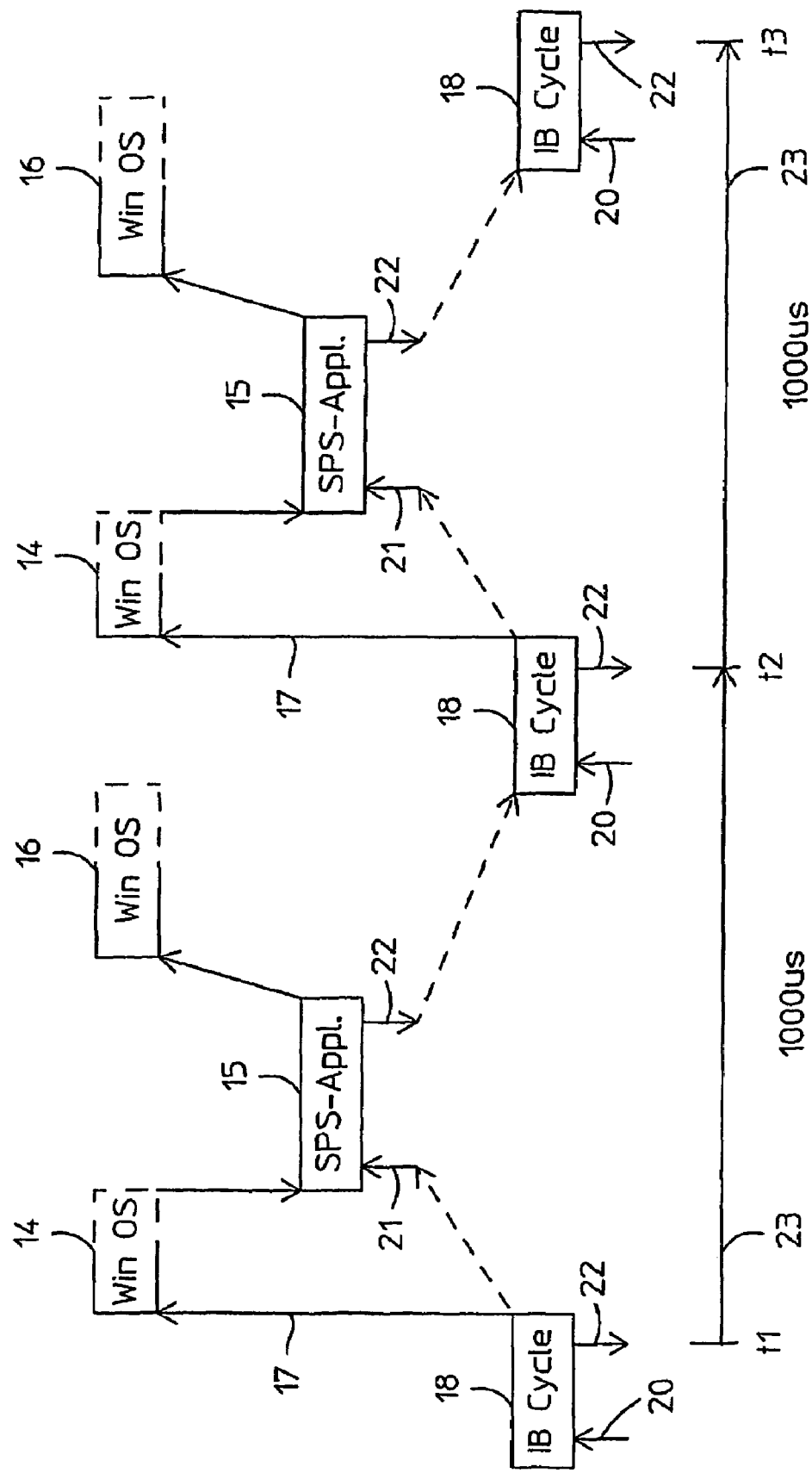
FIG. 3 is a diagram of the behavior of the PLC application and the non-real-tine capable operating system over time.

In computer 1 shown in FIG. 2, the non-real-time capable operating system 9 is executed which controls the activity of applications 10, 11. The activity of PLC application 10 is also controlled by non-real-time capable operating system 9. Non-real-time capable operating system 9 and all applications 10, 11 are executed in computer core 8. In this context, computer core 8 is taken to include all hardware components, non-real-time capable operating system 9, and all applications 10, 11 that are required for the operation of the computer. A fieldbus interface module 2 is connected to computer core 8 via a host interface 13, such as a PCI interface, which is a standard component of the computer. Fieldbus interface module 2 includes the control 12 of fieldbus 3; said control 12 of fieldbus 3 being parameterized by PLC application 10. Fieldbus interface module 2 provides the input data from fieldbus modules 4, 6 to host interface 13 and receives the output data for fieldbus modules 5, 7 via the host interface. The real-time capability is achieved in fieldbus interface module 2, whereby fieldbus 12 is controlled under real-time conditions. Due to the constant predictable cycle time 23 for the fieldbus, the output data and input data also meet the real-time conditions. The time sequence of the activities of cycle time 23 for the fieldbus and the control of fieldbus 12 in relation with PLC application 10 in computer core 8 are illustrated in FIG. 3. In the example outlined, the end of a cycle time 18 for the fieldbus is signaled to computer core 8 with an event request 17. Event requests are, for example, interrupt requests or other status messages. After an undeterminable period of time, called switchover time 14, the non-real-time capable operating system activates PLC application 10 in computer core 8. The execution of control program 15 within the PLC application starts with reading-in the input data from fieldbus interface module 2 via host interface 13, after which the output data is calculated as a function of the input data, and, finally, the output data is output to fieldbus interface module 2 via host interface 13. The fieldbus interface module is parameterized such that the execution of the next following fieldbus cycle 18 is started only when the specifiable time-slot patterns 23 for the start of the previous fieldbus cycle has expired. When fieldbus cycle 18 has expired, the output data is output to fieldbus modules 5, 7, and the new input data is read in from fieldbus modules 4, 6. This ensures that the output times 19 of the output data are related to each other by the fixed time-slot pattern 23. In the example shown in FIG. 3, a time-slot pattern of 1000 us is provided, which means that the output data is output every 1000 us with a very high accuracy. For example, if control program 15 within the PLC application requires, for example, 300 us and the execution of fieldbus cycle 18 takes 400 us, then switchover time 14 to the PLC application may be between 0 us and 300 us. In the process, control 12 of the fieldbus is performed such that a fieldbus cycle 18 is started every 1000 us in the fixed time-slot pattern 23.

LIST OF REFERENCE NUMERALS 1 computer
2 fieldbus interface module
3 fieldbus
4-7 fieldbus module
8 computer core
9 non-real-time capable operating system
10 PLC application
11 non-real-time capable applications
12 control of the fieldbus
13 host interface
14 switchover time to the PLC application
15 execution of the control program in the PLC application
16 execution of the operating system
17 event request of the fieldbus interface module
18 execution of the Interbus cycle
19 time of output of the output data at the fieldbus module
20 time of input of the input data at the fieldbus module
21 validity of the input data for the PLC application
22 validity of the output data from the PLC application
23 fixed time-slot pattern

What is claimed is:

1. A real-time capable control system comprising:
a computer having a non-real-time capable operating system and configured to execute at least one PLC application under the control of the non-real-time capable operating system;
a fieldbus interface module connected to a core of the computer via a host interface;
a fieldbus operable to execute a fieldbus cycle; and
at least one fieldbus module connected via the fieldbus,
wherein the real-time capability of the control system is achieved by a fixed time-slot pattern corresponding to the execution of the fieldbus cycle, and
wherein a timing for outputting output data of the PLC application and a timing for inputting input data of the PLC application are dependent on the fieldbus cycle and the fixed time-slot pattern.

2. The real-time capable control system as recited in claim 1, wherein the PLC application is executable under the full control of the non-real-time capable operating system.

3. The real-time capable control system as recited in claim 1, wherein the PLC application is a software configured to be executed in the computer core.

4. The real-time capable control system as recited in claim 2, wherein the PLC application is operable to provide functions for the execution of an application-specific control program.

5. The real-time capable control system as recited in claim 1, wherein the non-real-time capable operating system is a Windows operating system.

6. The real-time capable control system as recited in claim 1, wherein the fieldbus interface module is connected to the computer core via a host interface.

7. The real-time capable control system as recited in claim 6, wherein the host interface is a PCI interface.

8. The real-time capable control system as recited in claim 1, wherein the PLC application is configured to at least read in the input data or output the output data via the host interface.

9. The real-time capable control system as recited in claim 1, wherein the PLC application is configured to output the output data via the host interface and the fieldbus interface module is configured to output the output data to the fieldbus modules via the fieldbus within one fieldbus cycle.

10. The real-time capable control system as recited in claim 1, wherein the PLC application is configured to read in the input data from the fieldbus modules connected to the fieldbus through the fieldbus interface module via the host interface within one fieldbus cycle.

11. The real-time capable control system as recited in claim 1, wherein the fieldbus interface module includes a device for controlling the fieldbus.

12. The real-time capable control system as recited in claim 11, wherein the device for controlling the fieldbus is operable to control the time sequence of the fieldbus cycle.

13. The real-time capable control system as recited in claim 11, wherein the device for controlling the fieldbus is operable to control the time sequence in the fixed time-slot pattern.

14. The real-time capable control system as recited in claim 1, wherein the fixed time-slot pattern is configured to be parameterized.

15. The real-time capable control system as recited in claim 1, wherein the fieldbus is an Interbus.

16. The real-time capable control system as recited in claim 1 wherein the fieldbus module is associated with at least one actuator configured to be controlled by the PLC application.

17. The real-time capable control system as recited in claim 16 wherein the at least one actuator includes a positioning drive.

18. The real-time capable control system as recited in claim 16 wherein the at least one actuator includes a servomotor.

19. The real-time capable control system as recited in claim 1 wherein the fieldbus module is associated with at least one of a sensor switch and a limit switch.

* * * * *